(12) United States Patent
Fischer et al.

(10) Patent No.: US 11,345,305 B2
(45) Date of Patent: May 31, 2022

(54) ADAPTIVE AIRBAG FOR PROTECTING OCCUPANTS IN A VEHICLE

(71) Applicant: TRW Vehicle Safety Systems Inc., Washington, MI (US)

(72) Inventors: Kurt F. Fischer, Rochester, MI (US); Alexandra E. Schroeder, Lenox, MI (US); Angelo R. Adler, Washington, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 0 days.

(21) Appl. No.: 16/142,066

(22) Filed: Sep. 26, 2018

(65) Prior Publication Data

US 2020/0094770 A1  Mar. 26, 2020

(51) Int. Cl.
| | |
|---|---|
| *B60R 21/2338* | (2011.01) |
| *B60R 21/237* | (2006.01) |
| *B60R 21/015* | (2006.01) |
| *B60R 21/231* | (2011.01) |
| *B60R 21/26* | (2011.01) |
| *B60R 21/206* | (2011.01) |
| *B60R 21/00* | (2006.01) |

(52) U.S. Cl.
CPC .... *B60R 21/2338* (2013.01); *B60R 21/01554* (2014.10); *B60R 21/206* (2013.01); *B60R 21/237* (2013.01); *B60R 21/26* (2013.01); *B60R 2021/0032* (2013.01); *B60R 2021/0051* (2013.01); *B60R 2021/23107* (2013.01); *B60R 2021/23169* (2013.01)

(58) Field of Classification Search
CPC .............. B60R 21/2338; B60R 21/206; B60R 21/01554; B60R 21/237; B60R 21/26; B60R 2021/23107; B60R 2021/0051; B60R 2021/23169; B60R 2021/0032
See application file for complete search history.

(56) References Cited

U.S. PATENT DOCUMENTS 3,768,830 A * 10/1973 Hass ...................... B60R 21/233
280/729
4,290,627 A * 9/1981 Cumming ............. B60R 21/233
280/729

(Continued)

FOREIGN PATENT DOCUMENTS

| | | |
|---|---|---|
| JP | 2000016228 | 1/2000 |
| JP | 2001260800 | 9/2001 |
| JP | 2003137060 | 5/2003 |

*Primary Examiner* — Karen Beck
(74) *Attorney, Agent, or Firm* — Tarolli, Sundheim, Covell & Tummino LLP (57) ABSTRACT

An apparatus for helping to protect an occupant of a vehicle includes an airbag configured to be mounted to a support structure of the vehicle. The airbag is inflatable to deploy from a stored condition away from the support structure toward a vehicle seat in which the occupant is seated to one of a first deployed condition in which the airbag is configured for a non-reclined condition of the vehicle seat, and a second deployed condition in which the airbag is configured for a reclined condition of the vehicle seat. The airbag is configured to deploy to the first deployed condition in response to determining a non-reclined condition of the vehicle seat and to the second deployed condition in response to determining a reclined condition of the vehicle seat.

33 Claims, 6 Drawing Sheets

(56) References Cited

U.S. PATENT DOCUMENTS

| | | | |
|---|---|---|---|
| 5,240,283 A * | 8/1993 | Kishi | B60R 21/233 280/729 |
| 5,306,043 A * | 4/1994 | Mihm | B60R 21/233 280/732 |
| 5,405,166 A | 4/1995 | Rogerson | |
| 5,492,363 A | 2/1996 | Hartmeyer et al. | |
| 5,496,056 A * | 3/1996 | Dyer | B60R 21/2171 280/728.1 |
| 5,577,765 A * | 11/1996 | Takeda | B60R 21/233 280/729 |
| 6,017,057 A | 1/2000 | O'Docherty | |
| 6,276,716 B1 * | 8/2001 | Kato | B60R 21/233 280/735 |
| 6,471,239 B1 | 10/2002 | Nishijima et al. | |
| 6,783,151 B2 | 8/2004 | Rasch et al. | |
| 6,786,505 B2 | 9/2004 | Yoshida | |
| 6,932,365 B2 | 8/2005 | Hawthorn et al. | |
| 7,118,127 B2 | 10/2006 | Damm | |
| 7,731,229 B2 * | 6/2010 | Song | B60R 21/2165 280/732 |
| 7,950,688 B2 * | 5/2011 | Kotikovsky | B60R 21/206 280/728.2 |
| 8,419,058 B2 | 4/2013 | Fischer et al. | |
| 8,480,122 B2 * | 7/2013 | Ohara | B60R 21/2334 280/729 |
| 8,684,409 B2 * | 4/2014 | Wiaderny | B60R 21/2338 280/743.2 |
| 9,272,680 B1 * | 3/2016 | Mirzazadeh | B64D 11/0619 |
| 9,296,358 B2 * | 3/2016 | Chen | B60R 21/205 |
| 10,857,966 B2 * | 12/2020 | Deng | B60R 21/205 |
| 2002/0005638 A1 * | 1/2002 | Musiol | B60R 21/233 280/743.1 |
| 2002/0117835 A1 * | 8/2002 | Schneider | B60R 21/2338 280/728.2 |
| 2002/0158456 A1 * | 10/2002 | Fischer | B60R 21/205 280/743.2 |
| 2003/0015861 A1 * | 1/2003 | Abe | B60R 21/231 280/730.1 |
| 2003/0116945 A1 * | 6/2003 | Abe | B60R 21/231 280/729 |
| 2004/0012180 A1 | 1/2004 | Hawthorn et al. | |
| 2004/0124617 A1 * | 7/2004 | Morita | B60R 21/2165 280/732 |
| 2004/0262898 A1 | 12/2004 | Bauer et al. | |
| 2006/0192371 A1 | 8/2006 | Abe | |
| 2008/0246261 A1 * | 10/2008 | Webber | B60R 21/233 280/743.2 |
| 2011/0140399 A1 * | 6/2011 | Kuhlmann | B60R 21/205 280/730.2 |
| 2014/0319807 A1 * | 10/2014 | Sano | B60R 21/237 280/728.3 |
| 2015/0115580 A1 * | 4/2015 | Gould | B60R 21/231 280/730.1 |
| 2015/0151707 A1 * | 6/2015 | Chen | B60R 21/233 280/730.1 |
| 2015/0239414 A1 * | 8/2015 | Thomas | B60N 2/42718 701/45 |
| 2016/0272141 A1 * | 9/2016 | Ohmura | B60R 21/16 |
| 2016/0297392 A1 * | 10/2016 | Schneider | B60R 21/206 |
| 2017/0291566 A1 * | 10/2017 | Karlow | B60R 21/276 |
| 2018/0201222 A1 * | 7/2018 | Gandhi | B60R 21/2338 |
| 2018/0244234 A1 * | 8/2018 | Anae | B60R 21/2338 |
| 2018/0304844 A1 * | 10/2018 | Nagasawa | B60R 21/01554 |
| 2018/0345895 A1 * | 12/2018 | Farooq | B60R 21/231 |
| 2019/0047503 A1 * | 2/2019 | Faruque | B60R 21/01554 |
| 2019/0111880 A1 * | 4/2019 | Choi | B60R 21/2338 |
| 2019/0135220 A1 * | 5/2019 | Rupp | B60R 21/237 |
| 2019/0241145 A1 * | 8/2019 | Hiruta | B60R 21/2342 |
| 2019/0337478 A1 * | 11/2019 | Schneider | B60R 21/214 |
| 2020/0017060 A1 * | 1/2020 | Rutgersson | B60R 21/01512 |
| 2020/0017061 A1 * | 1/2020 | Rutgersson | B60R 21/015 |
| 2020/0079255 A1 * | 3/2020 | Ohno | B60R 16/037 |
| 2020/0094770 A1 * | 3/2020 | Fischer | B60R 21/231 |
| 2020/0122678 A1 * | 4/2020 | Tanaka | B60R 21/01512 |
| 2020/0164827 A1 * | 5/2020 | Oh | B60R 21/04 |
| 2020/0406850 A1 * | 12/2020 | Takeuchi | B60R 21/231 |

* cited by examiner

ADAPTIVE AIRBAG FOR PROTECTING OCCUPANTS IN A VEHICLE

FIELD OF THE INVENTION

The invention relates to an apparatus for helping to protect an occupant of a vehicle. More particularly, the invention relates to an airbag inflatable between a portion of a vehicle and a vehicle occupant. In one configuration, the invention relates to an airbag inflatable between an instrument panel and a front seat vehicle occupant.

BACKGROUND OF THE INVENTION

It is known to provide an inflatable vehicle occupant protection device, such as an airbag, for helping to protect an occupant of a vehicle. Airbags are inflatable between a portion of the vehicle and a vehicle occupant. One particular type of airbag is a frontal airbag inflatable between an occupant of a front seat of the vehicle and an instrument panel of the vehicle. Such airbags can be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag cover is connectable with the housing and/or instrument panel to help enclose and conceal the airbag in a stored condition. Upon deployment of the passenger airbag, the airbag cover opens to permit the airbag to move to an inflated position. The airbag cover opens as a result of forces exerted on the cover by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated position. The airbag cover opens as a result of forces exerted on the cover by the inflating driver airbag.

Vehicle seats can recline, to a degree selected by the occupant, in a range that spans from an upright condition to a reclined condition. The reclined position of the occupant affects his/her position relative to the airbag. Typical airbags, however, inflate and deploy to a single deployed condition regardless of whether the occupants are upright or reclined. The single deployed condition might not be optimal in helping to protect both a reclined occupant and an upright occupant.

Additionally, during a vehicle collision, it is possible that the instrument panel can impact the vehicle occupant's knees. When this occurs, forces on the occupant's lower extremities can be transmitted through the occupant's legs to the occupant's pelvis and cause injuries to the occupant's hip and/or pelvic areas. When the occupant is upright, the seat belt can restrain the occupant's lower torso/hips and knees from moving forward. However, when the occupant is reclined, the occupant can "slide" under the seat belt, which can result in the occupant's knees impacting the instrument panel. Accordingly, an airbag in the form of an inflatable knee bolster can be positioned in the area of the lower portion of the instrument panel and the vehicle footwell to help protect the knees, legs, and hips of the vehicle occupant during a collision.

SUMMARY OF THE INVENTION

According to one aspect, an apparatus for helping to protect an occupant of a vehicle includes an airbag configured to be mounted to a support structure of the vehicle. The airbag is inflatable to deploy from a stored condition away from the support structure toward a vehicle seat in which the occupant is seated to one of a first deployed condition in which the airbag is configured for a non-reclined condition of the vehicle seat, and a second deployed condition in which the airbag is configured for a reclined condition of the vehicle seat. The airbag in the first deployed condition is configured to extend a first longitudinal distance measured from a surface of the support structure toward the vehicle seat. The airbag in the second deployed condition is configured to extend a second longitudinal distance measured from a surface of the support structure toward the vehicle seat. The second longitudinal distance is greater than the first longitudinal distance. The airbag is configured to deploy to the first deployed condition in response to determining a non-reclined condition of the vehicle seat and to the second deployed condition in response to determining a reclined condition of the vehicle seat.

According to another aspect, alone or in combination with any other aspect, the support structure is an instrument panel of the vehicle. The apparatus further includes an airbag module mounted in the instrument panel. The airbag module includes the airbag, a housing for storing the airbag when the airbag is in the stored condition, and at least one inflator for inflating the airbag. A release mechanism is for controlling whether the airbag deploys to one of the first deployed condition and the second deployed condition. The release mechanism is one of directly and indirectly releasably connected to a portion of a rear panel of the airbag so that the rear panel is one of directly and indirectly releasably connected to the airbag module at the release mechanism. In the first deployed condition, the connection between the release mechanism and the rear panel is maintained so that the airbag deploys to the first deployed condition. In the second deployed condition, the connection between the release mechanism and the rear panel is released so that the airbag deploys to the second deployed condition.

According to another aspect, alone or in combination with any other aspect, as a result of the maintained connection of the release mechanism to the rear panel of the airbag, a portion of the rear panel is folded over itself to produce a fold in the rear panel of the airbag as the airbag deploys. The formation of the fold in the rear panel of the airbag causes the airbag to be pivoted in both a forward direction and a roofward direction so that the airbag deploys to the first deployed condition.

According to another aspect, alone or in combination with any other aspect, as a result of the maintained connection between the release mechanism and the rear panel of the airbag, the deployed airbag is held in the first deployed condition so that the airbag is substantially prevented from pivoting in both a rearward direction and a floorward direction toward the second deployed condition.

According to another aspect, alone or in combination with any other aspect, as a result of the maintained connection of the release mechanism to the rear panel of the airbag, the airbag inflates and deploys to the first deployed condition in which the airbag is in a deployed position that is pivoted in both a forward direction and a roofward direction from a deployed position of the airbag in the second deployed condition.

According to another aspect, alone or in combination with any other aspect, the release mechanism is indirectly connected to the rear panel of the airbag through a tether. The tether has a first tether end connected to a portion of the rear panel of the airbag and a second tether end releasably connected to the airbag module at the release mechanism. In the first deployed condition, the connection between the release mechanism and the tether is maintained so that the airbag deploys to the first deployed condition. In the second deployed condition, the connection between the release mechanism and the tether is released so that the airbag deploys to the second deployed condition.

According to another aspect, alone or in combination with any other aspect, the apparatus further includes a sensor for sensing an angle of a seat back of the vehicle seat. The sensor is in electrical communication with the release mechanism. When the sensor indicates that the angle of the seat back is below a predetermined angle at the time of a deployment event, the sensor determines that the vehicle seat is in a non-reclined condition and the connection between the release mechanism and the rear panel is maintained so that the airbag deploys to the first deployed condition. When the sensor indicates that the angle of the seat back is above the predetermined angle at the time of a deployment event, the sensor determines that the vehicle seat is in the reclined condition and the release mechanism is actuated to release the connection between the release mechanism and the rear panel so that the airbag deploys to the second deployed condition.

According to another aspect, alone or in combination with any other aspect, the apparatus further includes a first tether having a first end connected to the support structure via a release mechanism, and an opposite second end connected to a housing for storing the airbag when the airbag is in the stored condition. The first tether has a first segment comprises a trigger tether and a second segment comprises an anchor tether. The trigger tether comprises the first end of the first tether. The anchor tether comprises the second end of the first tether. A second tether comprises a shaping tether having a first end secured to the first tether by a releasable connection at a location between the first and second ends of the first tether. The second tether has a second end connected to a rear panel of the airbag. The release mechanism controls whether the airbag deploys to one of the first deployed condition and the second deployed condition. In the first deployed condition, the connection between the release mechanism and the trigger tether is released so that the airbag deploys to the first deployed condition. In the second deployed condition, the connection between the release mechanism and the trigger tether is maintained so that the airbag deploys to the second deployed condition.

According to another aspect, alone or in combination with any other aspect, in the first deployed condition, the connection between the release mechanism and the trigger tether is released so that the releasable connection maintains the connection between the anchor tether and the shaping tether. The anchor tether and the shaping tether in combination holds the airbag in the first deployed condition so that the airbag is substantially prevented from pivoting in both a rearward direction and a floorward direction toward the second deployed condition. In the second deployed condition, the connection between the release mechanism and the trigger tether is maintained so that the trigger tether becomes tensioned by the shaping tether due to deployment of the airbag. The trigger tether when tensioned ruptures the release connection which disconnects the shaping tether from the anchor tether and thereby permits the airbag to deploy to the second deployed condition.

According to another aspect, alone or in combination with any other aspect, the apparatus further includes a sensor for sensing an angle of a seat back of the vehicle seat. The sensor is in electrical communication with the release mechanism. When the sensor indicates that the angle of the seat back is below a predetermined angle at the time of a deployment event, the sensor determines that the vehicle seat is in a non-reclined condition and the release mechanism is actuated to release the connection between the release mechanism and the trigger tether so that the airbag deploys to the first deployed condition. When the sensor indicates that the angle of the seat back is above the predetermined angle at the time of a deployment event, the sensor determines that the vehicle seat is in the reclined condition and the connection between the release mechanism and the trigger tether is maintained so that the airbag deploys to the second deployed condition.

According to another aspect, alone or in combination with any other aspect, the support structure is an instrument panel of the vehicle. The airbag has a front panel presented facing the occupant and a rear panel positioned against the instrument panel that provides a reaction surface for supporting the airbag against the force of impacts.

According to another aspect, alone or in combination with any other aspect, when the airbag is in the second deployed condition, a top portion of the rear panel is presented facing and is spaced apart from at least a portion of a windshield and at least a portion of a vehicle roof so that when the airbag is absorbing impacts, the airbag is capable of moving into the space between the top portion of the rear panel and both the windshield and the vehicle roof.

According to another aspect, alone or in combination with any other aspect, the airbag in the first deployed condition is configured so that a reward extent of the airbag terminates above a seat base of the vehicle seat and an upper extent of the airbag terminates at a headrest of the vehicle seat in the non-reclined condition. The airbag in the second deployed condition is configured so that the rearward extent of the airbag terminates above a reclined seat back of the vehicle seat and the upper extent of the airbag terminates at the headrest of the vehicle seat in the reclined condition.

According to another aspect, alone or in combination with any other aspect, when the airbag is in the first deployed condition, the airbag extends the first longitudinal distance toward the vehicle seat and a first vertical distance measured from a point of the airbag closest to a vehicle floor toward a vehicle roof. The first vertical distance is greater than the first longitudinal distance. When the airbag is in the second deployed condition, the airbag extends the second longitudinal distance toward the vehicle seat and a second vertical distance measured from a point of the airbag closest to the vehicle floor toward the vehicle roof. The second longitudinal distance is greater than the second vertical distance. The first vertical distance is greater than the second vertical distance.

According to another aspect, alone or in combination with any other aspect, the support structure is an instrument panel of the vehicle.

According to another aspect, alone or in combination with any other aspect, the apparatus further includes a knee airbag mounted in the lower portion of the support structure. The knee airbag is inflatable to deploy from a stored condition toward at least a portion of the occupants knees to a deployed condition to at least partially prevent the occupant from sliding in a forward direction.

According to another aspect, alone or in combination with any other aspect, the support structure is an instrument panel of the vehicle. The apparatus further includes an airbag module mounted in the lower portion of the instrument panel. The airbag module including the airbag, the knee airbag, a housing for storing the airbag and the knee airbag when the airbag and the knee airbag are in a stored condition, and at least one inflator for inflating the airbag and the knee airbag.

According to another aspect, alone or in combination with any other aspect, the airbag modules includes a first inflator for inflating the airbag and a second inflator for inflating the knee airbag. When the airbag and the knee airbag are deployed, the knee airbag is inflated to a higher pressure level than the airbag.

According to another aspect, alone or in combination with any other aspect, the airbag and the knee airbag are integrally formed together to define a single inflatable volume.

According to another aspect, alone or in combination with any other aspect, the airbag is a passenger frontal airbag.

According to another aspect, alone or in combination with any other aspect, an airbag module includes the apparatus.

According to another aspect, alone or in combination with any other aspect, a vehicle safety system includes the airbag module.

According to another aspect, alone or in combination with any other aspect, a vehicle safety system for helping to protect front row occupants of a driverless vehicle includes the airbag module.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

An apparatus 100 for helping to protect an occupant 102 of a vehicle 104 includes an inflatable vehicle occupant protection device 106 in the form of an airbag. In the embodiment illustrated in FIGS. 1-2, the airbag 106 is a passenger frontal airbag for helping to protect an occupant 102 of a vehicle seat 108 on a passenger side 110 of the vehicle 104. Those skilled in the art will appreciate that the apparatus 100 disclosed herein could be adapted for a driver side vehicle occupant (not shown) or occupants of rearward rows of the vehicle 104, such as a $2^{nd}$ row, $3^{rd}$ row, etc., of the vehicle (not shown). Further, those skilled in the art will appreciate that the apparatus 100 disclosed herein can be used to help protect front row occupants of driverless, autonomous, semi-autonomous, automated, and/or semi-automated vehicles. Therefore, in vehicles such as driverless, autonomous, semi-autonomous, automated, and/or semi-automated vehicles, the airbag 106 can be located in a traditional front row driver position.

The occupant 102 has a head 112, a torso 114, a pelvic area 116, which includes hips 118, and legs 120 extending from the hips 118. Each leg 120 includes an upper leg portion 122 and a lower leg portion 124 interconnected at a knee 126. The vehicle 104 includes the vehicle seat 108 having a seat base 127 and a reclinable seat back 128, a windshield 130, a vehicle roof 132, a vehicle floor 134, and an instrument panel 136. The seat back 128 is typically positioned in either an upright condition, alternatively referred to as a non-reclined condition, (FIG. 1) or a reclined condition (FIG. 2), and thus the occupant 102 is usually either positioned in an upright (FIG. 1) or a reclined (FIG. 2) condition, respectively. The instrument panel 136 has a lower portion 138, which substantially faces the vehicle floor 134, a central portion 140, which substantially faces the seat back 128/occupant 102, and an upper portion 142, which substantially faces at least one of the windshield 130 and the vehicle roof 132. A footwell 144 for receiving the lower leg portion 124 of the occupant 102 is at least partially defined by the vehicle floor 134 and the lower portion 138 of the instrument panel 136.

The airbag 106 can be constructed of any suitable material, such as nylon (e.g., woven nylon 6-6 yarns), and can be constructed in any suitable manner. For example, the airbag 106 can include one or more pieces or panels of material. If more than one piece or panel is used, the pieces or panels can be interconnected by known means, such as stitching, ultrasonic welding, heat bonding, or adhesives, to form the airbag 106. The airbag 106 can be uncoated, coated with a material, such as a gas impermeable urethane, or laminated with a material, such as a gas impermeable film. The airbag 106 thus can have a gas-tight or substantially gas-tight construction. Those skilled in the art will appreciate that alternative materials, such as polyester yarn, and alternatives coatings, such as silicone, can also be used to construct the airbag 106.

The airbag 106 is mounted to a support structure 135 of the vehicle 104. The airbag 106 is inflatable and deployable from a stored condition away from the support structure 135 toward a deployed condition in which the airbag 106 has a front panel 158 presented facing the occupant 102. The support structure 135 can be any structure in the vehicle 104 that will accommodate the airbag 106 being deployed therefrom so that the front panel 158 of the deployed airbag 106 is presented facing the occupant 102. For example, if the vehicle 104 was designed so that the occupant 102 was facing a rearward direction, as indicated by an arrow identified at "C" in FIG. 1, the support structure 135 could be any structure that faces the rearward facing occupant 102 so that when the airbag 106 deploys, the front panel 158 of the deployed airbag 106 is presented facing the rearward facing occupant 102.

Figures 1, 1A:
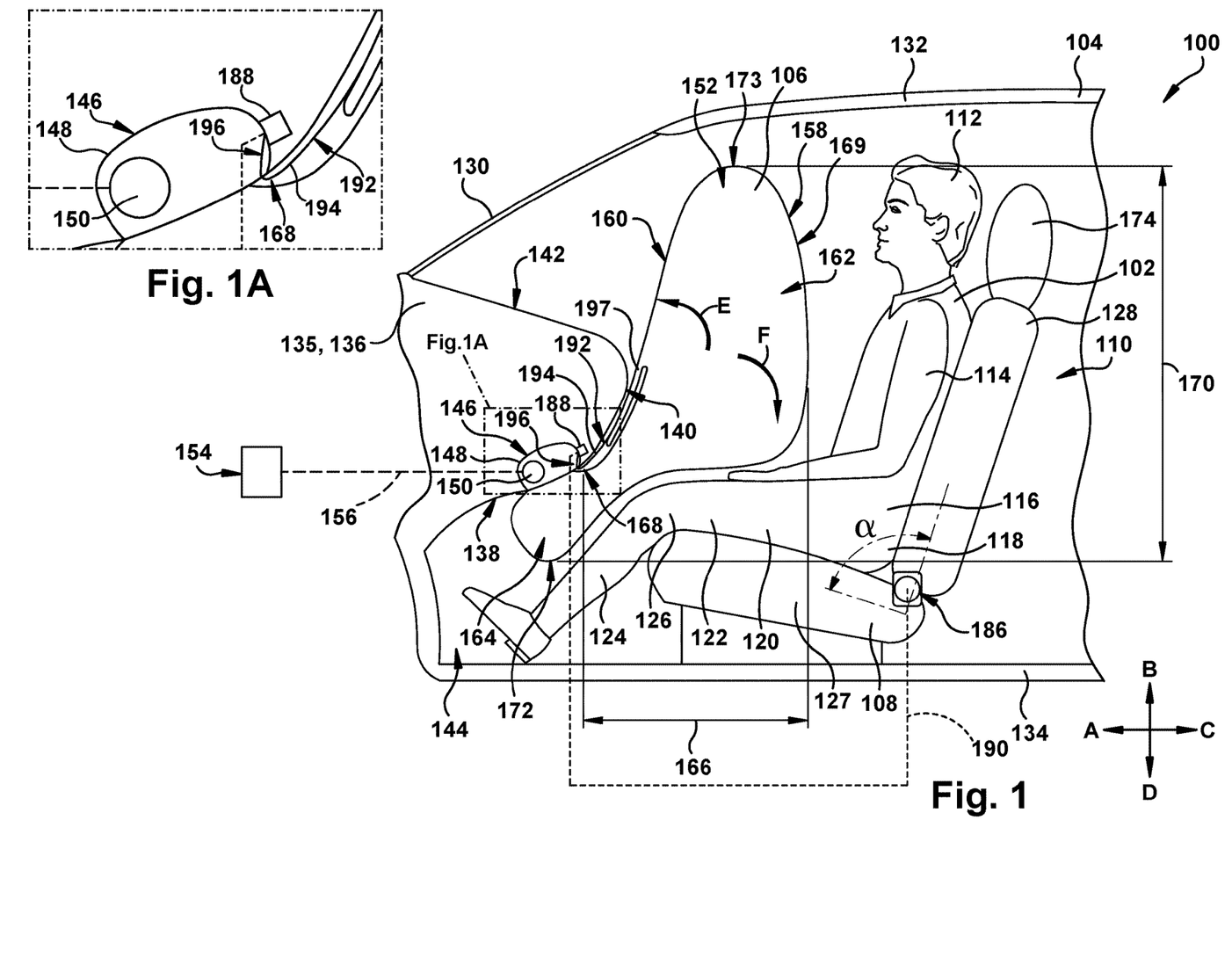
FIG. 1 is a schematic side view illustrating an apparatus for helping to protect an occupant of a vehicle in a first condition, according to an embodiment of the invention.
FIG. 1A is a schematic side view illustrating a portion of the apparatus of FIG. 1.
Figure 2:
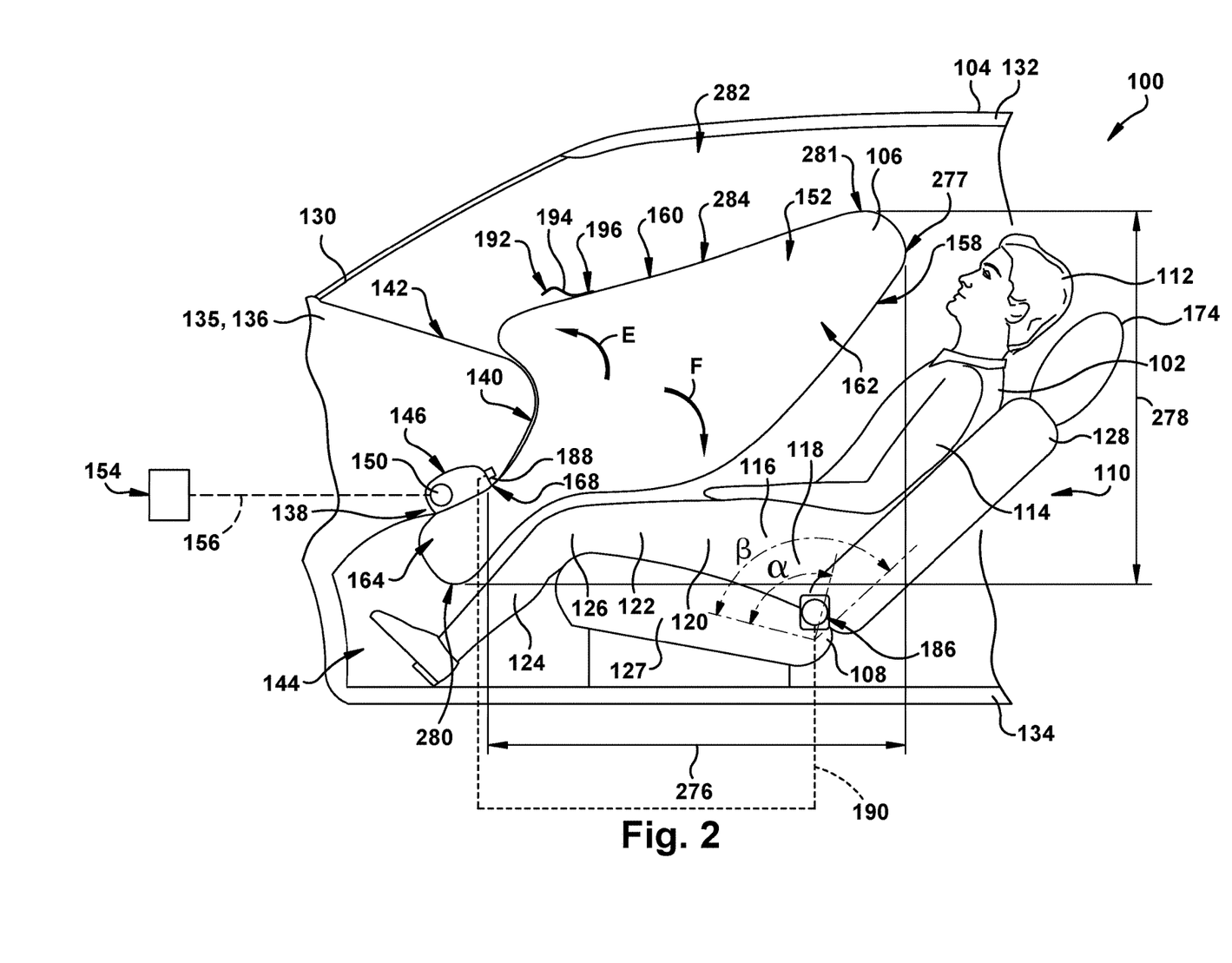
FIG. 2 is a schematic side view illustrating the apparatus of FIG. 1 in a second condition.

In the configuration shown in FIGS. 1-2, the support structure 135 is the instrument panel 136. As shown in FIGS. 1-2, the airbag 106 is mounted to the instrument panel 136. In particular, the airbag 106 can be part of an airbag module 146 that is mounted to the lower portion 138 of the instrument panel 136. The airbag module 146 can include the airbag 106, a housing 148 for storing the airbag 106 when the airbag 106 is in the stored condition, and at least one inflator 150 for inflating the airbag 106. In the stored condition, the airbag 106 is folded and placed in the housing 148. The airbag 106 is inflatable to deploy from the stored condition away from the instrument panel 136 toward the vehicle seat 108 in which the occupant 102 is seated.

An airbag cover (not shown) can be releasably connected to the instrument panel 136 and/or the housing 148. In a closed condition (not shown), the airbag cover helps enclose the airbag 106 in the stored condition in the housing 148. The airbag cover is movable to an opened condition to uncover an opening through which the airbag 106 can be deployed from the stored condition in the housing 148. The airbag cover can be connected to the vehicle 104, e.g., the instrument panel 136, either directly or through the housing 148, by means (not shown), such as a plastic hinge portion, a strap, or a tether. In one embodiment, the airbag cover can be rupturable and can tear open when the airbag 106 is inflated and deployed.

The inflator 150 is actuatable to provide inflation fluid to an inflatable volume 152 of the airbag 106 to inflate and deploy the airbag 106 to the deployed condition. The inflator 150 can be of any known type, such as stored gas, solid propellant, augmented, or hybrid. The apparatus 100 can include a collision sensor, illustrated schematically at 154, for sensing an event for which inflation of the airbag 106 is desired, such as a collision. The inflator 150 is operatively connected to the collision sensor 154 via lead wires 156.

The airbag 106 can also include a vent (not shown) for releasing inflation fluid from the inflatable volume 152 of the airbag 106. The vent can be selectively actuated in order to help control or tailor inflation of the airbag 106 in response to vehicle conditions, occupant conditions, or both. The vent can be actuatable actively, for example, in response to conditions determined via active sensors, or passively, for example, having a configuration responsive to physical conditions at the time of inflation. Alternatively, the vent can be a passive vent that always vents inflation fluid. The airbag 106 can also be ventless.

As shown in the configuration of FIGS. 1-2, when the airbag 106 is inflated and deployed, the airbag 106 has the front panel 158 presented facing the occupant 102 and a rear panel 160 positioned against the instrument panel 136. The rear panel 160 of the airbag 106 engages and is supported on at least one of the lower portion 138, the central portion 140 and the upper portion 142 of the instrument panel 136. The instrument panel 136 provides a reaction surface against which the airbag 106 is supported, and opposes the impact forces applied to the airbag 106 by the occupant 102.

The airbag 106 has an upper airbag portion 162 and a lower airbag portion 164 when the airbag 106 is inflated and deployed. Because the airbag 106 is mounted to the lower portion 138 of the instrument panel 136, the lower airbag portion 164 of the deployed airbag 106 is positioned at least partially in the footwell 144. The lower airbag portion 164 can help protect the occupant's legs 120, pelvis 116, and hips 118 by cushioning the knees 126 and lower legs 124 from impacts with the instrument panel 136.

The lower airbag portion 164 can also assist in rotating the occupant 102 into the deployed airbag 106. For example, during a collision event, the occupant 102 can be urged to slide in a forward direction, as indicated by an arrow identified at "A" in FIG. 1, toward the instrument panel 136. When at least a portion of the occupant's legs 120, such as the occupant's knees 126, impacts the lower airbag portion 164 of the deployed airbag 106, at least one of the occupant's head and torso 112, 114 can urged to rotate at the occupant's hips 118 and/or pelvic area 116 to cause at least one of the occupant's head and torso 112, 114 to rotate into the deployed airbag 106.

Additionally, the lower airbag portion 164 can help prevent the occupant 102 from sliding in the forward direction A into the footwell 144. In particular, the lower airbag portion 164 can act as a barrier that receives at least a portion of the occupant's legs 120 to at least partially prevent the occupant 102 from sliding into the footwell 144.

The upper airbag portion 162 extends from the lower airbag portion 164 toward the vehicle roof 132. The upper airbag portion 162 can help protect the occupant's head 112, torso 114, pelvis 116, and hips 118 from impacts with at least one of the upper and central portions 140, 142 of the instrument panel 136.

To account for the occupant 102 being positioned in either the reclined or the upright conditions at the time of a deployment event of the airbag 106, such as in the event of a vehicle collision, the airbag 106 is configured to adapt to the condition of the seat back 128, and accordingly, the upright/reclined condition of the occupant 102. In other words, in response to determining the upright/non-reclined condition of the seat back 128 of the vehicle seat 108, the airbag 106 is configured to be inflatable to deploy from the stored condition to a first deployed condition in which the airbag 106 is configured for the upright/non-reclined condition of the seat back 128 (FIG. 1). In response to determining the reclined condition of the seat back 128 of the vehicle seat 108, the airbag 106 is configured to be inflatable to deploy from the stored condition to a second deployed condition in which the airbag 106 is configured for the reclined condition of the seat back 128 (FIG. 2).

In the first deployed condition, the airbag 106 has an upright orientation and is adapted to restrain an upright occupant 102. The rear panel 160 of the airbag 106 in the first deployed condition engages and is supported on at least one of the lower and central portions 138, 140 of the instrument panel 136. The airbag 106 in the first deployed condition is configured to extend a first longitudinal distance 166 measured from a surface 168 of the instrument panel 136 toward the vehicle seat 108 so that a rearward extent 169 of the airbag 106 terminates above the seat base 127 of the vehicle seat 108. The airbag 106 in the first deployed condition is also configured to extend a first vertical distance 170 measured from a point 172 of the deployed airbag 106 closest to the vehicle floor 134 toward the vehicle roof 132 so that an upper extent 173 of the airbag 106 terminates at a headrest 174 of the vehicle seat 108 in the upright/non-reclined condition. The first vertical distance 170 is greater than the first longitudinal distance 166, such that the airbag 106 extends further in a roofward direction, as indicated by an arrow identified at "B" in FIG. 1, than it does in a rearward direction, as indicated by the arrow identified at "C" in FIG. 1. The front panel 158 of the airbag 106 in the first deployed condition is configured to be spaced a predetermined distance from the likely position of the head 112 of the upright occupant 102 in order to minimize rotational velocity of the upright occupant's head 112 during a collision event, and thus help prevent injury.

However, as shown in FIG. 2, the occupant 102 can be positioned in the reclined condition instead of the upright condition. In such case, the likely position of the reclined occupant's head 112 would be spaced further from the front panel 158 of the airbag 106 in the first deployed condition than the predetermined distance between the likely position of the upright occupant's head 112 and the front panel 158 of the airbag 106 in the first deployed condition. Thus, the rotational velocity of the reclined occupant's head 112 would potentially be greater than the rotational velocity of the upright occupant's head 112 during a collision event because the reclined occupant's head 112 has a further distance to travel, i.e., more time to accelerate, from the headrest 174 of the vehicle seat 108 to the deployed airbag 106 in the first deployed condition. An increase in rotational velocity can lead to an increased risk of injury.

To account for the reclined occupant 102, the airbag 106 can be deployed to the second deployed condition, which is adapted to restrain the reclined occupant 102. To help reduce the rotational velocity of a reclined occupant's head 112, the airbag 106 in the second deployed condition is configured to receive the reclined occupant's torso 114 and head 112 at an earlier point in time than what the airbag 106 in the first deployed condition would receive the reclined occupant's torso 114 and head 112. In other words, the front panel 158 of the airbag 106 in the second deployed condition is configured to be spaced a predetermined distance from the likely position of the head 112 and torso 114 of a reclined occupant 102 in order to minimize rotational velocity of the reclined occupant's head 112 during a collision event, and thus help prevent injury.

Accordingly, the airbag 106 in the second deployed condition is configured to extend a second longitudinal distance 276 measured from the surface 168 of the instrument panel 136 toward the vehicle seat 108 so that a rearward extent 277 of the airbag 106 terminates above the seat back 128 of the vehicle seat 108 in the reclined condition. The second longitudinal distance 276 of the airbag 106 in the second deployed condition is greater than the first longitudinal distance 166 of the airbag 106 in the first deployed condition. Therefore, the airbag 106 in the second deployed condition extends further in the rearward direction C than what the airbag 106 does in the first deployed condition and is configured to receive the reclined occupant's head 112 earlier than what the airbag 106 in the first deployed condition would. By engaging the reclined occupant's head 112 and torso 114 earlier, the rotational velocity of the reclined occupant's head 112 is reduced because the reclined occupant's head 112 does not travel as far as it would have if the airbag 106 was in the first deployed condition.

The airbag 106 in the second deployed condition is also configured to extend a second vertical distance 278 measured from a point 280 of the deployed airbag 106 closest to the vehicle floor 134 toward the vehicle roof 132 so that an upper extent 281 of the airbag 106 terminates at the headrest 174 of the vehicle seat 108 in the reclined condition. The second longitudinal distance 276 is greater than the second vertical distance 278, so that the airbag 106 extends further in the rearward direction C than it does in the roofward direction B. The first vertical distance 170 of the airbag 106 in the first deployed condition is greater than the second vertical distance 278 of the airbag 106 in the second deployed condition. This is because the likely position of the upright occupant's head 112 is spaced closer to the vehicle roof 132 than what the likely position of the reclined occupant's head 112 would be, so the airbag 106 in the first deployed condition would desirably extend further in the roofward direction B in order to account for the higher likely position of the upright occupant's head 112.

In the second deployed condition, the rear panel 160 of the airbag 106 engages and is supported on at least one of the lower portion 138, the central portion 140, and the upper portion 142 of the instrument panel 136, and more particularly, on the lower portion 138, the central portion 140, and the upper portion 142 of the instrument panel 138. Due to the engagement and support between the rear panel 160 and the instrument panel 136, the airbag 106 is not, and is not required to be, supported on the windshield 130 and/or the vehicle roof 132. When the airbag 106 is in the second deployed condition and absorbing impacts, the airbag 106 is capable of moving into a space 282 between a top portion 284 of the rear panel 160 and both the windshield 130 and the vehicle roof 132 because the top portion 284 of the rear panel 160 is presented facing and is spaced apart from at least a portion of the windshield 130 and at least a portion of the vehicle roof 132 when the airbag 106 is initially deployed to the second deployed condition.

To determine whether the seat back 128, and accordingly the occupant 102, is in either the upright condition or the reclined condition, the apparatus 100 can include a sensor for making this determination, such as at least one seat back sensor, illustrated schematically at 186, for sensing the angle of the seat back 128 in relation to the seat base 127 of the vehicle seat 108. The seat back sensor 186 can be at least one of an inclinometer, a rotary potentiometer, a flexible potentiometer, an optical sensor, an ultrasonic radar, a motion sensor, a pressure sensor, any other sensor capable of ascertaining the angle of the seat back 128, or any combination thereof. The seat back sensor 186 can be in electrical communication with a release mechanism 188, via lead wires 190, to control whether the airbag 106 deploys to either the first or second deployed condition.

The release mechanism 188 can be a part of the airbag module 146. The release mechanism 188 is directly or indirectly releasably connected to a portion of the rear panel 160 of the airbag 106 so that the rear panel 160 can be directly/indirectly releasably connected to the airbag module 146 at the release mechanism 188. The release mechanism 188 may, for example, be an actuatable fastener, such as a pyrotechnic bolt, that is actuatable to break or release the direct/indirect connection of the release mechanism 188 to the rear panel 160 of the airbag 106. Those skilled in the art will appreciate that alternative release mechanisms 188 could be utilized. For example, the release mechanism 188 may comprise an actuatable latch, a solenoid mechanism, or actuatable cutters or shears. Those skilled in the art will appreciate that the release mechanism 188 can be indirectly or directly releasably connected to a portion of the rear panel 160 of the airbag 106 in any known manner. For example, in the example configuration shown in FIGS. 1-2, the release mechanism 188 is indirectly releasably connected to the rear panel 160 of the airbag 106 through a tether 194. In such case, the release mechanism 188 is releasably connected to a second tether end 192 of the tether 194, such that the second tether end 192 is releasably connected to the airbag module 146 at the release mechanism 188. The tether 194 has a first tether end 196 that is connected to a portion of the rear panel 160 of the airbag 106. This connection can be established by known means, such as stitching or ultrasonic welding.

Upon sensing the occurrence of a deployment event for which inflation of the airbag 106 is desired, such as a vehicle collision, the seat back sensor 186 senses the angle of the seat back 128 in relation to the seat base 127 of the vehicle seat 108. If the seat back sensor 186 indicates that the seat back 128 is at an angle indicative of the upright/non-reclined condition at the time of the deployment event, the seat back sensor 186 determines that the seat back 128 of the vehicle seat 108 is in the non-reclined condition. The upright/non-reclined condition can, for example, be determined when the seat back 128 is at or below a predetermined angle $\alpha$, as shown in FIG. 1.

In response to determining that the seat back 128 is in the upright/non-reclined condition, the seat back sensor 186 then transmits a signal, via the lead wires 190, to the release mechanism 188 to maintain the direct/indirect connection between the release mechanism 188 and the rear panel 160 of the airbag 106. If the release mechanism 188 is directly connected to the rear panel 160 of the airbag 106, the release mechanism 188 maintains the connection between the release mechanism 188 and the rear panel 160. If the release mechanism 188 is indirectly connected to the rear panel 160, such as through the tether 194, as shown in the example configuration of FIGS. 1-1A, the release mechanism 188 maintains the connection between the release mechanism 188 and the tether 194. The collision sensor 154 provides a signal to the inflator 150 via the lead wires 156. Upon receiving the signal from the collision sensor 154, the inflator 150 is actuated and provides inflation fluid to the inflatable volume 152 of the airbag 106 in any known manner. The inflating airbag 106 exerts a force on the airbag cover, which moves the airbag cover to the opened condition.

As a result of the maintained direct/indirect connection between the release mechanism 188 and the rear panel 160 of the airbag 106, a portion of the rear panel 160 is folded over itself so that the airbag 106 inflates and deploys from the stored condition to the first deployed condition and extends the first longitudinal distance 166, as shown in FIG. 1. In other words, the maintained direct/indirect connection between the release mechanism 188 and the rear panel 160 produces a fold/pleat 197 in the rear panel 160 of the airbag 106 as the airbag 106 deploys. The formation of the fold/pleat 197 causes the deploying airbag 106 to pivot/rotate in both the forward direction A and the roofward direction B, in a trajectory indicated by an arrow identified at "E" in FIG. 1, so that the airbag 106 inflates to the first deployed condition. Without the formation of the pleat/fold 197 in the rear panel 160, the airbag 106 would substantially deploy to the second deployed condition.

By maintaining the direct/indirect connection between the release mechanism 188 and the rear panel 160, the airbag 106 inflates and deploys to the first deployed condition in which the airbag 106 is pivoted/rotated (in the direction of the arrow E) from the deployed position of the airbag 106 in the second deployed condition. In short, the deployed position of the airbag 106 in the first deployed condition is substantially in a position which is pivoted/rotated (in the direction of the arrow E) from the deployed position of the airbag 106 in the second deployed condition, which can be seen in FIG. 2. The maintained direct/indirect connection between the release mechanism 188 and the rear panel 160 holds the deployed airbag 106 in the first deployed condition so that the airbag 106 is substantially prevented from rotating/pivoting in both the rearward direction D and a floorward direction E, in a trajectory indicated by an arrow identified at "F" in FIGS. 1-2, toward the second deployed condition.

If the seat back sensor 186 indicates that the seat back 128 is at an angle indicative of the reclined condition at the time of the deployment event, the seat back sensor 186 determines that the seat back 128 of the vehicle seat 108 is in the reclined condition. The reclined condition can, for example, be determined when the seat back 128 is above the predetermined angle α, such as at an angle β, as shown in FIG. 2. In response to determining that the seat back 128 is in the reclined condition, the seat back sensor 186 then transmits a signal, via the lead wires 190, to the release mechanism 188 to actuate the release mechanism 188 to release the direct/indirect connection between the release mechanism 188 and the rear panel 160. If the release mechanism 188 is directly connected to the rear panel 160 of the airbag 106, the release mechanism 188 releases the connection between the release mechanism 188 and the rear panel 160. If the release mechanism 188 is indirectly connected to the rear panel 160, such as through the tether 194, as shown in the example configuration of FIGS. 1-2, the release mechanism 188 releases the connection between the release mechanism 188 and the second tether end 192 of the tether 194. With the direct/indirect connection between the release mechanism 188 and the rear panel 160 released, the airbag 106 deploys to the second deployed condition and extends the second longitudinal distance 276 when the inflator 150 provides inflation fluid to the inflatable volume 152 of the airbag 106, as shown in FIG. 2.

In other words, the release of the direct/indirect connection between the release mechanism 188 and the rear panel 160 as the airbag 106 inflates permits the fold/pleat 197 portion of the airbag 106, which would have been otherwise unable to substantially inflate due to the formation of the fold/pleat 197, to inflate so that the airbag 106 inflates to the second deployed condition and extends the second longitudinal distance 276. The release of the direct/indirect connection of the release mechanism 188 and the rear panel 160 together with the inflation of the fold/pleat 197 portion of the airbag 106 causes the airbag 106 to inflate to the deployed position of the airbag 106 in the second deployed condition, which is a position that is pivoted/rotated (in the trajectory of the arrow F) from the deployed position of the airbag 106 in the first deployed condition. If the direct/indirect connection between the release mechanism 188 and the rear panel 160 would have been maintained, the airbag 106 would have deployed to the first deployed condition, as discussed above. Thus, by releasing the direct/indirect connection between the release mechanism 188 and the rear panel 160 and inflating the fold/pleat 197 portion of the airbag 106, the airbag 106 is rotated/pivoted (in the trajectory of the arrow F) from the deployed position of the airbag 106 in the first deployed position so that the airbag 106 deploys to the deployed position of the airbag 106 in the second deployed position.

Instead of the release mechanism 188 being directly releasably connected to the second tether end 192 of the tether 194, as illustrated in the configuration of FIGS. 1-2, the release mechanism 188 can be indirectly releasably connected to the second tether end 192 through a separate, single length of tether material 301, as depicted in the configuration of FIGS. 3-6. In such case, the tether 194 is in the form of a shaping tether 194. The single length of tether material 301 includes a portion comprising an anchor tether 303 and a portion comprising a trigger tether 305. In this configuration, the shaping tether 194, the anchor tether 303 and the trigger tether 305 form a three-leg tether system 307 in which the anchor tether 303 and the trigger tether 305 are segments of the single length of tether material 301, and the shaping tether 194 is its own separate length of tether material.

The anchor tether 303 has a first end portion 309 anchored to the vehicle 104. Anchoring the anchor tether 303 to the vehicle 104 could be achieved in many different manners. The anchor tether 303 could, for example, be secured to the airbag 106 (e.g., to the rear panel 160 of the airbag 106, or to the airbag 106 at a location near a mouth portion of the airbag 106 where the airbag 106 is secured to the housing 148), or to a structure of the vehicle 104, such as the airbag module 146 (e.g., the housing 148) or the instrument panel 136. In the configuration illustrated in FIGS. 3-6, the anchor tether 303 is secured to the housing 148.

The first tether end 196 of the shaping tether 194 is connected to a portion of the rear panel 160 of the airbag 106. This connection can be established by known means, such as stitching or ultrasonic welding. The trigger tether 305 has a first end portion 311 secured to a support structure in the vehicle 104, such as the housing 148, by the release mechanism 188. The release mechanism 188 may, for example, be an actuatable fastener, such as a pyrotechnic bolt, that is actuatable to break or release the connection of the first end portion 311 of the trigger tether 305 to the housing 148.

Figure 5:
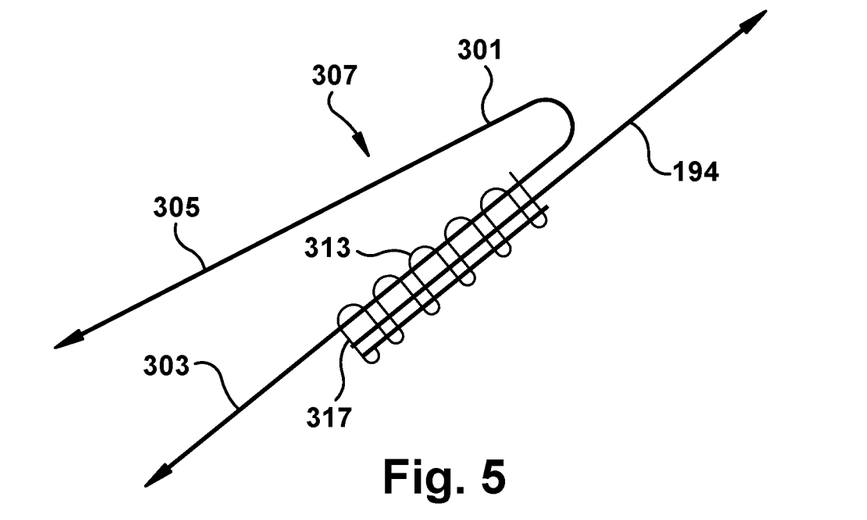
FIGS. 5-6 are schematic illustrations of a portion of the apparatus of FIGS. 3 and 4.

In an unactuated condition of the tether system 307, the anchor tether 303, the shaping tether 194, and the trigger tether 305 are interconnected. This is shown in detail in FIGS. 5-6. As shown in FIG. 5, the anchor tether 303 and the trigger tether 305 are segments of the single length of tether material 301. The shaping tether 194 is a separate length of tether material. A releasable connection 313 interconnects the shaping tether 194 to the single length of tether material 301 at or near the interface between the anchor tether 303 and the trigger tether 305. In the illustrated embodiment, the releasable connection 313 comprises releasable tear stitching. The releasable connection 313 could, however, have alternative connection or construction. For example, the releasable connection 313 could comprise a releasable bonding agent, such as an adhesive or tape, or a releasable mechanical device, such as a rivet or staple.

Figure 6:
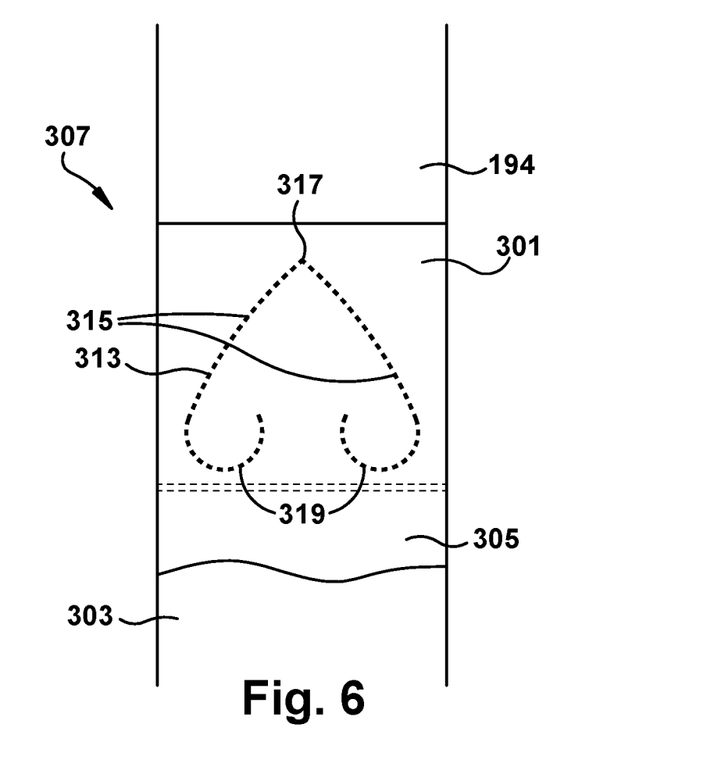

According to the configuration of FIGS. 3-6, a rupturable tear stitch configuration that promotes predictability, repeatability, and reliability in releasing interconnected fabrics is used to form the tear stitching 313. FIGS. 5-6 illustrate by way of example tear stitching 313 in accordance with the configuration of FIGS. 3-6. Referring to FIGS. 5-6, the tear stitching 313 has an inverted V-shaped configuration with outwardly diverging segments 315 or legs that meet at a break point 317. Terminal end portions 319 of the segments 315 have an inwardly curved configuration that terminates short of intersecting its associated segment.

The tear stitching 313 is configured to rupture in response to the tension applied to the shaping tether 194 and the trigger tether 305 during deployment of the airbag 106. According to the configuration of FIGS. 3-6, the tear stitching 313 is adapted to release the connection between the anchor tether 303 and the shaping tethers 194 depending on condition of the seat back 128, and accordingly the occupant 102, when the airbag 106 is deployed.

The airbag 106 and the tether system 307 are constructed and arranged such that the amount of tension sufficient to rupture the tear stitching 313 differs between the shaping tether 194 and the trigger tether 305. Tension applied to the tear stitching 313 by the shaping tether 194 acts generally parallel to the anchor tether 303. This helps distribute the tension force over the end portions 319 and the segments 315 of the tear stitching 313. The tear stitching 313 may thus offer a relatively high resistance to rupture in response to tension applied by the shaping tether 194 and the anchor tether 303 (referred to herein as "shaping strength").

Tension applied to the tear stitching 313 by the shaping tether 194 and the trigger tether 305 acts at an angle to the anchor tether 303 (see FIG. 5) and thus produces a "peeling" force or action between the trigger tether 305 and the shaping tether 194. This peeling action helps focus the tension on the break point 317 of the tear stitching 313. Peeling force depends on pulling the trigger tether 305 back along the stitching 313 and the stitched portion of the anchor tether 303. Ideally, tension pulling the trigger tether 305 parallel to the anchor tether 303 and the plane of the stitching 313 produces a pulling force that is the strongest and the most focused on the break point 317. Tension pulling the trigger tether 305 substantially in this direction, as shown for example in FIG. 5, can provide a peeling force that is sufficiently strong and focused.

Due to the strength and focusing properties of the peeling force applied by the trigger tether 305, the tear stitching 313 may thus offer a relatively lower resistance rupture in response to tension applied by the shaping tether 194 and the trigger tether 305 (referred to herein as "trigger strength"). The tether system 307 thus may have a relatively high shaping strength and a correspondingly low trigger strength.

Because of this, the rupture strength of the tear stitching 313 may be selected to have a desired combination of shaping and trigger strengths. This can be achieved, for example, through the careful selection of the thread material, stitch pattern, number of stitches, and/or thread pattern. For instance, in one configuration, the tear stitching 313 may have a trigger strength selected such that the tear stitching ruptures in response to a force of about 100 Newtons applied via the shaping tether 194 and the trigger tether 305. In contrast, this same tear stitching 313 may also have a shaping strength selected such that the tear stitching 313 is capable of withstanding a force of about 2000 Newtons applied via the shaping tether 194 and the anchor tether 303.

According to the configuration of FIGS. 3-6, the segment of the single length of tether material 301 forming the trigger tether 305 has a length that is shorter than the length of the segment of the single length of tether material 301 forming the anchor tether 303. Due to this configuration, those skilled in the art will appreciate that, in response to deployment of the airbag 106, tension will be applied to the tear stitching 313 by the trigger tether 305 and the shaping tether 194. This is the case, of course, as long as the connection between the trigger tether 305 and the housing 148 is maintained by the release mechanism 188.

If the release mechanism 188 remains unactuated and maintains the connection of the trigger tether 305 to the housing 148, then tension is applied to the tear stitching 313 by the shaping tether 194 and the trigger tether 305, due to the trigger tether 305 being shorter than the anchor tether 303. As a result, the peeling action focuses the tension on the break point 317. When the tension on the trigger tether 305 exceeds the trigger strength, the tear stitching 313 ruptures beginning at the break point 317. The rupture then travels along the curved segments 315 until the trigger tether 305 and the shaping tether 194 are released from each other.

If the release mechanism 188 is actuated and releases the connection of the trigger tether 305 to the housing 148, then tension is applied to the tear stitching 313 by the shaping tether 194 and the anchor tether 303, since the trigger tether 305 is no longer anchored to the vehicle 104. As a result, the connection between the shaping tether 194 and the anchor tether 303 relies on the shaping strength of the tear stitching 313. The shaping strength of the tear stitching 313 may preferably be configured to withstand the force of inflation and deployment of the airbag 106. As a result, the shaping tether 194 and the anchor tether 303 combine to restrict deployment of the airbag 106, particularly the rear panel 160, and thereby restrict or limit the airbag 106 to the first deployed condition, as will be described in more detail below.

The shaping strength and trigger strength of the tear stitching 313 can be tailored to desired values through a variety of configurable characteristics. For example, the material used to construct the tear stitching 313 may be selected to have material properties that help provide the desired shaping and tear strengths. Also, stitching itself (i.e., stitches per inch, type of stitch) may be selected to have material properties that help provide the desired shaping and tear strengths. Further, the shape of the tear stitching 313 may differ from the V-shaped configurations illustrated in FIGS. 5-6 and may be selected to have material properties that help provide the desired shaping and tear strengths.

According to the configuration of FIGS. 3-6, in response to determining that the seat back 128 is in the upright/non-reclined condition upon the occurrence of a deployment event for which inflation of the airbag 106 is desired (see FIG. 3), the seat back sensor 186 transmits a signal, via the lead wires 190, to the release mechanism 188 to actuate the release mechanism 188 to release the connection between the release mechanism 188 and the trigger tether 305. As a result, the trigger tether 305 does not apply any tension or force on the tear stitching 313 (see FIGS. 5-6). Because of this, the shaping tether 194 and the anchor tether 303 become tensioned by the deploying rear panel 160 of the airbag 106. When this occurs, the tension in the shaping tether 194 and the anchor tether 303 is applied to the tear stitching 313, which connects the two tethers.

Figures 3, 3A:
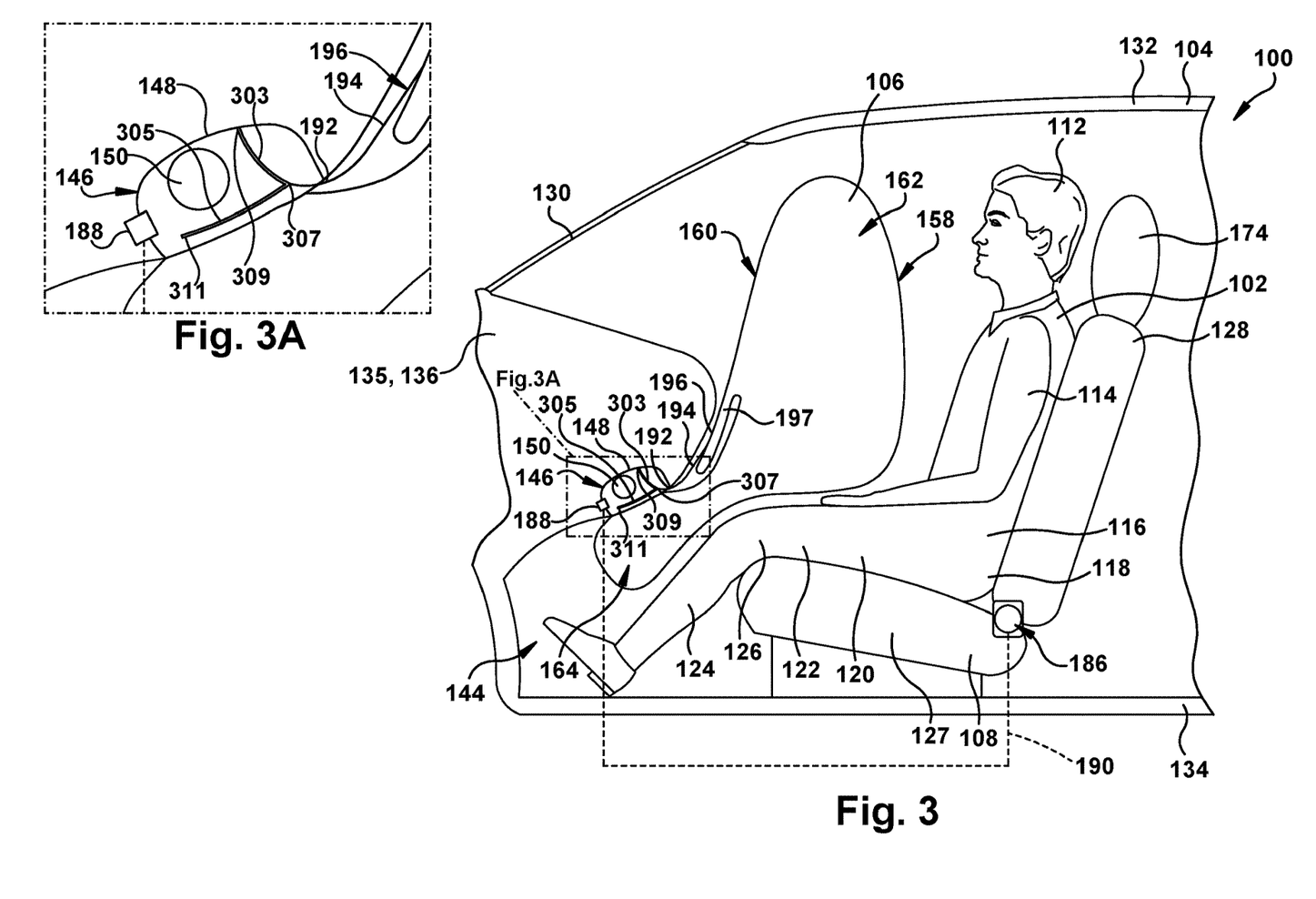
FIG. 3 is a schematic side view illustrating the apparatus of FIG. 1 in the first condition, including another configuration for a portion of the apparatus.
FIG. 3A is a schematic side view illustrating a portion of the apparatus of FIG. 3.

Since, as described above, the tear stitching 313 has a relatively high shaping strength configured to withstand relatively high tension forces between the shaping tether 194 and the anchor tether 303, the tear stitching 313 does not rupture in the event of the upright/non-reclined condition of the seat back 128 of FIG. 3. As a result of the maintained connection between the shaping tether 194 and the anchor tether 303, a portion of the rear panel 160 is folded over itself so that the airbag 106 inflates and deploys from the stored condition to the first deployed condition, in a similar manner as described above.

According to the configuration of FIGS. 3-6, in response to determining that the seat back 128 is in the reclined condition upon the occurrence of a deployment event for which inflation of the airbag 106 is desired (see FIG. 4), the seat back sensor 186 transmits a signal, via the lead wires 190, to the release mechanism 188 to maintain the connection between the release mechanism 188 and the trigger tether 305. As a result, the trigger tether 305 remains anchored in the vehicle 104 and therefore applies a tension or force on the tear stitching 313 (see FIGS. 5-6). Because of this, the trigger tether 305 becomes tensioned under the force of the deploying rear panel 160 and the trigger tether 305 applies a significant tension or force on the tear stitching 313.

Figure 4:
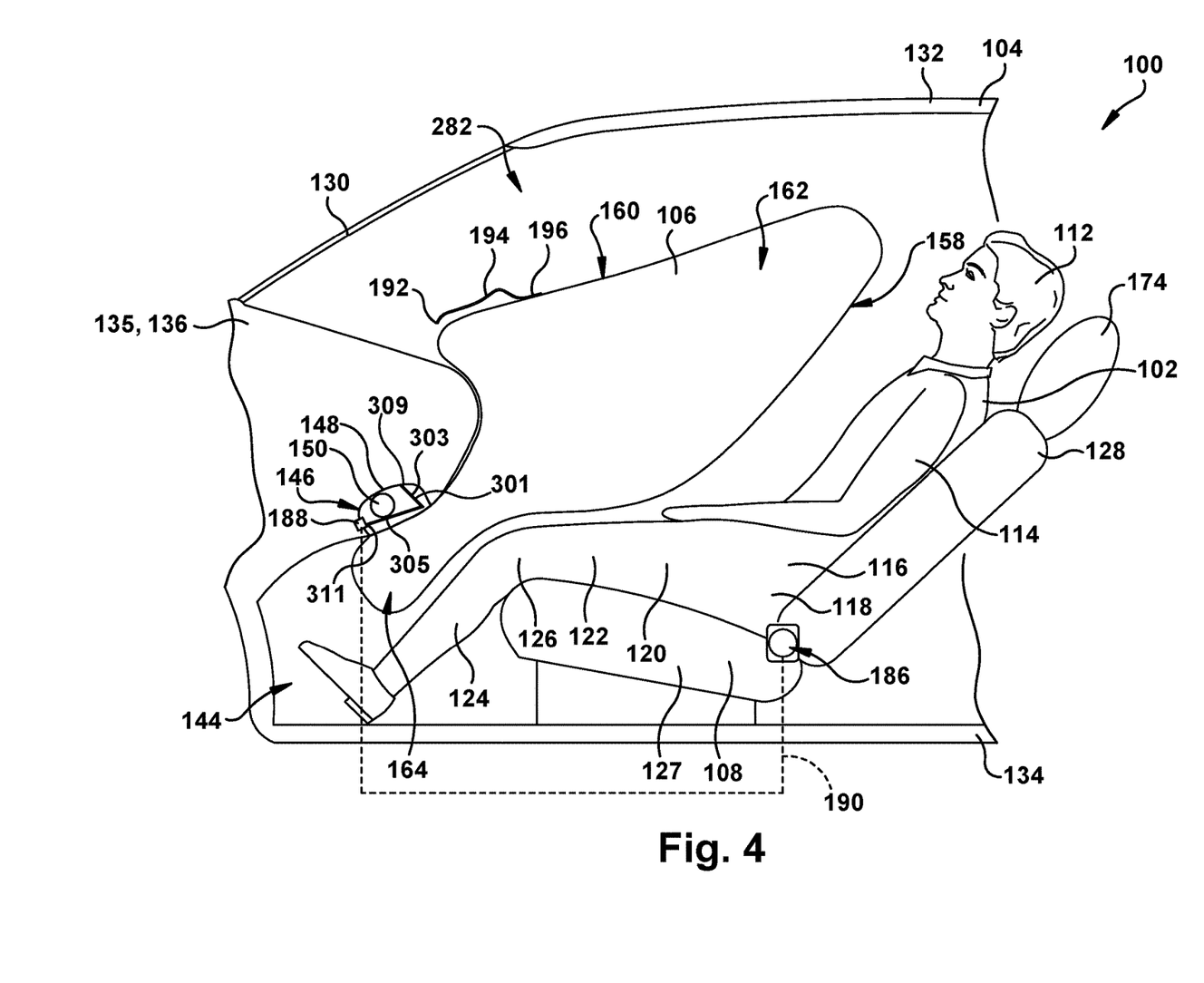
FIG. 4 is a schematic side view illustrating the apparatus of FIG. 1 in the second condition, including another configuration for a portion of the apparatus.

Since, as described above, the tear stitching 313 has a relatively low trigger strength configured to rupture under relatively low tension forces between the trigger tether 305 and the shaping tether 194, the tear stitching 313 ruptures in the event of the reclined condition of the seat back 128 of FIG. 4. This releases the connection between the anchor tether 303 and the shaping tether 194. As a result, the shaping tether 194 does not cause a portion of the rear panel 160 to be folded over itself so that the airbag 106 inflates and deploys from the stored condition to the first deployed condition, and instead the airbag 106 inflates and deploys from the stored condition to the second deployed condition illustrated in FIG. 4, in a similar manner as described above.

Figure 7:
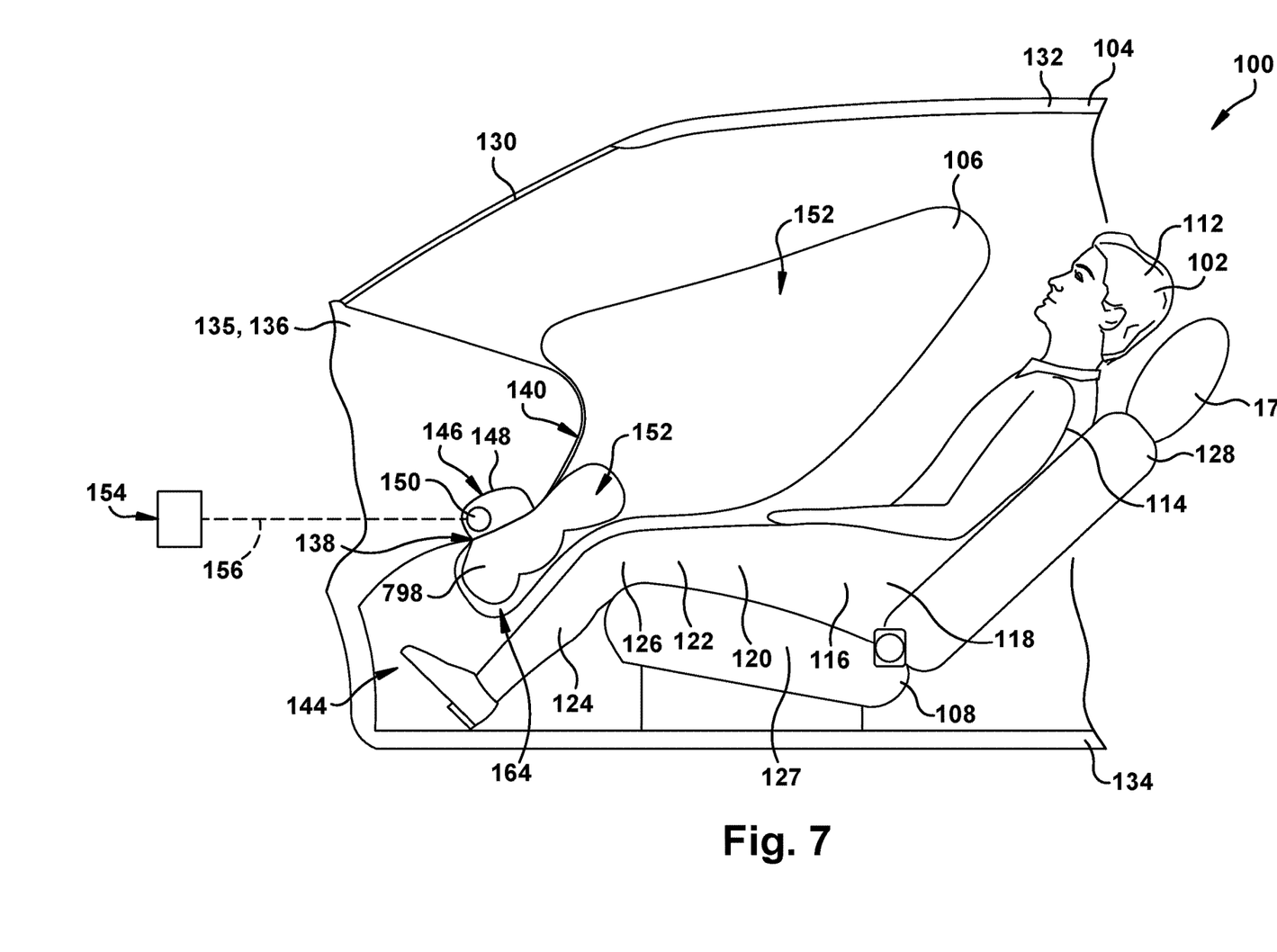
FIG. 7 is a schematic side view illustrating an apparatus for helping to protect an occupant of a vehicle, according to another embodiment of the invention.

As shown in FIG. 7, according to one example configuration, the apparatus 100 can include a knee airbag 798 mounted in the lower portion 138 of the instrument panel 136. The knee airbag 798 is inflatable to deploy from a stored condition toward at least a portion of the occupant's knees 126 to a deployed condition. Similar to the lower airbag portion 164, the knee airbag 798 can help protect the occupant's legs 120 (the upper leg portion 122, the lower leg portion 124, and the knees 126), the pelvis 116, and the hips 118 from impacts with at least one of the lower and central portions 138, 140 of the instrument panel 136. The knee airbag 798 can also assist in rotating the occupant 102 into the deployed airbag 106. Additionally, the knee airbag 798 can at least partially prevent the occupant 102 from sliding in the forward direction A into the footwell 144.

The knee airbag 798 can be a part of the airbag module 146 that includes the airbag 106, the knee airbag 798, the housing 148 for storing the airbag 106 and the knee airbag 798 when the airbag 106 and the knee airbag 798 are in the stored condition, and the at least one inflator 150 for inflating the airbag 106 and the knee airbag 798. The knee airbag 798 can be formed separately from the airbag 106. Alternatively, the knee airbag 798 can be formed in an interior of the airbag 106, such as at least partially in the interior of the lower airbag portion 164. The knee airbag 798 can be inflated to a higher pressure level than the airbag 106.

The knee airbag 798 can be constructed of any suitable material, such as nylon (e.g., woven nylon 6-6 yarns), and can be constructed in any suitable manner. For example, the knee airbag 798 can include one or more pieces or panels of material. If more than one piece or panel is used, the pieces or panels can be interconnected by known means, such as stitching, ultrasonic welding, heat bonding, or adhesives, to form the knee airbag 798. The knee airbag 798 can be uncoated, coated with a material, such as a gas impermeable urethane, or laminated with a material, such as a gas impermeable film. The knee airbag 798 thus can have a gas-tight or substantially gas-tight construction. Those skilled in the art will appreciate that alternative materials, such as polyester yarn, and alternatives coatings, such as silicone, can also be used to construct the knee airbag 798.

The knee airbag 798 can also include a vent (not shown) for releasing inflation fluid from the inflatable volume 152 of the knee airbag 798. The vent can be selectively actuated in order to help control or tailor inflation of the knee airbag 798 in response to vehicle conditions, occupant conditions, or both. The vent can be actuatable actively, for example, in response to conditions determined via active sensors, or passively, for example, having a configuration responsive to physical conditions at the time of inflation. Alternatively, the vent can be a passive vent that always vents inflation fluid.

The airbag 106 and the knee airbag 798 can be formed as separate components having fluidly isolated inflatable volumes 152. To this end, first and second inflators 150 are actuatable to provide inflation fluid to inflate and deploy the airbag 106 and the knee airbag 798, respectively, to the inflated and deployed condition. The first and second inflators 150 can each be of any known type, such as stored gas, solid propellant, augmented or hybrid. Each of the first and second inflators 150 can be operatively connected to the collision sensor 154 via known means, such as the lead wires 156.

The airbag 106 and the knee airbag 798 can be formed as a single, integrally formed airbag with one inflatable volume 152. In other words, the interiors of the airbag 106 and the knee airbag 798 are fluidly connected together to form the inflatable volume 152. Instead of having first and second inflators 150 for individually inflating the airbag 106 and the knee airbag 798, respectively, a single inflator 150 can be used to inflate both the airbag 106 and the knee airbag 798.

Upon sensing the occurrence of an event for which deployment of the airbag 106 and the knee airbag 798 is desired, such as a vehicle collision, the collision sensor 154 provides a signal to each the at least one inflator 150. Upon receiving the signal from the collision sensor 154, the at least one inflator 150 is actuated and provide inflation fluid to the airbag 106 and the knee airbag 798 in a known manner. The inflating airbag 106 and the knee airbag 798 exert a force on the airbag cover, which moves the airbag cover to the opened condition, allowing the airbag 106 and the knee airbag 798 to each inflate from the stored condition to the deployed condition. The airbag 106 and the knee airbag 798, while inflated, help protect the occupant 102 from impacts with parts of the vehicle 104, such as the instrument panel 136. Those having ordinary skill in the art will understand that the knee airbag 798 inflates and deploys to the deployed condition regardless of the deployed condition that the airbag 106 deploys to, such as the first and second deployed conditions discussed above.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
    an airbag configured to be mounted to a support structure of the vehicle and being inflatable to deploy from a stored condition away from the support structure toward a vehicle seat in which the occupant is seated to one of a first deployed condition in which the airbag is configured for a non-reclined condition of the vehicle seat, and a second deployed condition in which the airbag is configured for a reclined condition of the vehicle seat;
    wherein the airbag in the first deployed condition is configured to extend a first longitudinal distance measured from a surface of the support structure toward the vehicle seat, and wherein the airbag in the second deployed condition is configured to extend a second longitudinal distance measured from the surface of the support structure toward the vehicle seat, the second longitudinal distance being greater than the first longitudinal distance;
    wherein the airbag is configured to deploy to the first deployed condition in response to determining a non-reclined condition of the vehicle seat and to the second deployed condition in response to determining a reclined condition of the vehicle seat, the airbag in the first and second deployed conditions being configured so that a rearward extent of the airbag terminates one of above or rearward of a seat base of the vehicle seat and an upper extent of the airbag extends vertically to one of at or above a vertical position of a headrest of the vehicle seat; and
    wherein the airbag comprises a front panel presented toward the occupant and a rear panel presented toward the support structure when the airbag is deployed, the airbag being configured to maintain a fold in the rear panel to place the airbag in the first deployed condition and to release the fold in the rear panel of the airbag to place the airbag in the second deployed condition.

2. The apparatus recited in claim 1, wherein the support structure is an instrument panel of the vehicle, and the apparatus of claim 1 further comprises:
    an airbag module mounted in the instrument panel, the airbag module including the airbag, a housing for storing the airbag when the airbag is in the stored condition, and at least one inflator for inflating the airbag; and
    a release mechanism for controlling whether the airbag deploys to one of the first deployed condition and the second deployed condition, the release mechanism being one of directly and indirectly releasably connected to the rear panel of the airbag so that the rear panel is one of directly and indirectly releasably connected to the airbag module at the release mechanism;
    wherein in the first deployed condition, the connection between the release mechanism and the rear panel is maintained so that the airbag deploys to the first deployed condition, and in the second deployed condition, the connection between the release mechanism and the rear panel is released so that the airbag deploys to the second deployed condition.

3. The apparatus recited in claim 1 further comprising:
    a release mechanism for controlling whether the airbag deploys to one of the first deployed condition and the second deployed condition, the release mechanism being one of directly and indirectly releasably connected to a portion of a rear panel of the airbag so that the rear panel is one of directly and indirectly releasably connected to the airbag module at the release mechanism;
    wherein in the first deployed condition, the connection between the release mechanism and the rear panel is maintained so that the airbag deploys to the first deployed condition, and in the second deployed condition, the connection between the release mechanism and the rear panel is released so that the airbag deploys to the second deployed condition;
    wherein the fold in the rear panel is maintained as a result of the maintained connection of the release mechanism to the rear panel of the airbag, which causes the airbag to be pivoted in both a forward direction and a roofward direction so that the airbag deploys to the first deployed condition.

4. The apparatus of claim 3, wherein as a result of the maintained connection between the release mechanism and the rear panel of the airbag, the deployed airbag is held in the first deployed condition so that the airbag is substantially prevented from pivoting in both a rearward direction and a floorward direction toward the second deployed condition.

5. The apparatus of claim 2, wherein as a result of the maintained connection of the release mechanism to the rear panel of the airbag, the airbag inflates and deploys to the first deployed condition in which the airbag is in a deployed position that is pivoted in both a forward direction and a roofward direction from a deployed position of the airbag in the second deployed condition.

6. The apparatus recited in claim 2, wherein the release mechanism is indirectly connected to the rear panel of the airbag through a tether, the tether having a first tether end connected to a portion of the rear panel of the airbag and a second tether end releasably connected to the airbag module at the release mechanism; and
    wherein in the first deployed condition, the connection between the release mechanism and the tether is maintained so that the airbag deploys to the first deployed condition, and in the second deployed condition, the connection between the release mechanism and the tether is released so that the airbag deploys to the second deployed condition.

7. The apparatus recited in claim 2, further comprising a sensor for sensing an angle of a seat back of the vehicle seat, the sensor being in electrical communication with the release mechanism;

wherein when the sensor indicates that the angle of the seat back is below a predetermined angle at the time of a deployment event, the sensor determines that the vehicle seat is in a non-reclined condition and the connection between the release mechanism and the rear panel is maintained so that the airbag deploys to the first deployed condition, and when the sensor indicates that the angle of the seat back is above the predetermined angle at the time of a deployment event, the sensor determines that the vehicle seat is in the reclined condition and the release mechanism is actuated to release the connection between the release mechanism and the rear panel so that the airbag deploys to the second deployed condition.

8. The apparatus recited in claim 1, further comprising:
a first tether having a first end connected to the support structure via a release mechanism, and an opposite second end connected to a housing for storing the airbag when the airbag is in the stored condition, the first tether having a first segment comprising a trigger tether and a second segment comprising an anchor tether, the trigger tether comprising the first end of the first tether, the anchor tether comprising the second end of the first tether; and
a second tether comprising a shaping tether having a first end secured to the first tether by a releasable connection at a location between the first and second ends of the first tether, the second tether having a second end connected to a rear panel of the airbag;
wherein the release mechanism controls whether the airbag deploys to one of the first deployed condition and the second deployed condition, in the first deployed condition, the connection between the release mechanism and the trigger tether is released so that the airbag deploys to the first deployed condition, and in the second deployed condition, the connection between the release mechanism and the trigger tether is maintained so that the airbag deploys to the second deployed condition.

9. The apparatus recited in claim 8, wherein in the first deployed condition, the connection between the release mechanism and the trigger tether is released so that the releasable connection maintains the connection between the anchor tether and the shaping tether, the anchor tether and the shaping tether in combination holding the airbag in the first deployed condition so that the airbag is substantially prevented from pivoting in both a rearward direction and a floorward direction toward the second deployed condition, and wherein in the second deployed condition, the connection between the release mechanism and the trigger tether is maintained so that the trigger tether becomes tensioned by the shaping tether due to deployment of the airbag, the trigger tether when tensioned rupturing the release connection which disconnects the shaping tether from the anchor tether and thereby permits the airbag to deploy to the second deployed condition.

10. The apparatus recited in claim 8, further comprising a sensor for sensing an angle of a seat back of the vehicle seat, the sensor being in electrical communication with the release mechanism;
wherein when the sensor indicates that the angle of the seat back is below a predetermined angle at the time of a deployment event, the sensor determines that the vehicle seat is in a non-reclined condition and the release mechanism is actuated to release the connection between the release mechanism and the trigger tether so that the airbag deploys to the first deployed condition, and when the sensor indicates that the angle of the seat back is above the predetermined angle at the time of a deployment event, the sensor determines that the vehicle seat is in the reclined condition and the connection between the release mechanism and the trigger tether is maintained so that the airbag deploys to the second deployed condition.

11. The apparatus recited in claim 1, wherein the support structure is an instrument panel of the vehicle, and wherein the airbag has a front panel presented facing the occupant and a rear panel positioned against the instrument panel that provides a reaction surface for supporting the airbag against the force of impacts.

12. The apparatus of claim 1, wherein when the airbag is in the second deployed condition, a top portion of the rear panel is presented facing and is spaced apart from at least a portion of a windshield and at least a portion of a vehicle roof so that when the airbag is absorbing impacts, the airbag is capable of moving into the space between the top portion of the rear panel and both the windshield and the vehicle roof.

13. The apparatus recited in claim 1, wherein the airbag in the first deployed condition is configured so that the upper extent of the airbag terminates vertically at about the vertical extent of the headrest of the vehicle seat in the non-reclined condition, and wherein the airbag in the second deployed condition is configured so that the rearward extent of the airbag terminates above a reclined seat back of the vehicle seat and the upper extent of the airbag terminates at the headrest of the vehicle seat in the reclined condition.

14. The apparatus recited in claim 1, wherein when the airbag is in the first deployed condition, the airbag extends the first longitudinal distance toward the vehicle seat and a first vertical distance measured from a point of the airbag closest to a vehicle floor toward a vehicle roof, the first vertical distance being greater than the first longitudinal distance, and when the airbag is in the second deployed condition, the airbag extends the second longitudinal distance toward the vehicle seat and a second vertical distance measured from a point of the airbag closest to the vehicle floor toward the vehicle roof, the second longitudinal distance being greater than the second vertical distance, the first vertical distance being greater than the second vertical distance.

15. The apparatus recited in claim 14, wherein the support structure is an instrument panel of the vehicle.

16. The apparatus recited in claim 1, further comprising a knee airbag mounted in the lower portion of the support structure and being inflatable to deploy from a stored condition toward at least a portion of the occupants knees to a deployed condition to at least partially prevent the occupant from sliding in a forward direction.

17. The apparatus recited in claim 16, wherein the support structure is an instrument panel of the vehicle, and the apparatus further comprises an airbag module mounted in the lower portion of the instrument panel, the airbag module including the airbag, the knee airbag, a housing for storing the airbag and the knee airbag when the airbag and the knee airbag are in a stored condition, and at least one inflator for inflating the airbag and the knee airbag.

18. The apparatus recited in claim 17, wherein the airbag module includes a first inflator for inflating the airbag and a second inflator for inflating the knee airbag, and when the airbag and the knee airbag are deployed, the knee airbag is inflated to a higher pressure level than the airbag.

19. The apparatus recited in claim 17, wherein the airbag and the knee airbag are integrally formed together to define a single inflatable volume.

20. The apparatus of claim 1, wherein the airbag is a passenger frontal airbag.

21. An airbag module comprising the apparatus of claim 1.

22. A vehicle safety system comprising the airbag module of claim 21.

23. A vehicle safety system for helping to protect front row occupants of a driverless vehicle comprising the airbag module of claim 21.

24. The apparatus of claim 1, wherein as a result of the maintaining the fold in the rear panel during deployment, the airbag pivots in both a forward direction and a roofward direction to the first deployed condition.

25. The apparatus of claim 1, wherein as a result of releasing the fold in the rear panel during deployment, pivots in both a rearward direction and a floorward direction toward the second deployed condition.

26. The apparatus recited in claim 1 further comprising:
a release mechanism for controlling whether the airbag deploys to the first deployed condition or the second deployed condition, the release mechanism comprising a releasable connection to the rear panel of the airbag;
wherein the release mechanism is configured to maintain the connection to the rear panel in response to determining the non-reclined condition of the vehicle seat so that the airbag deploys to the first deployed condition;
wherein the release mechanism is configured to release the connection to the rear panel in response to determining the reclined condition of the vehicle seat so that the airbag deploys to the second deployed condition; and
wherein the fold in the rear panel is maintained as a result of the maintained connection of the release mechanism to the rear panel of the airbag, which causes the airbag to be pivoted in a forward direction away from the vehicle seat and a roofward direction so that the airbag deploys to the first deployed condition.

27. The apparatus of claim 1, wherein in the first deployed condition the airbag extends a first vertical distance measured from a point of the airbag closest to a vehicle floor toward a vehicle roof, and when the airbag is in the second deployed condition the airbag extends a second vertical distance measured from a point of the airbag closest to the vehicle floor toward the vehicle roof, the first vertical distance being greater than the second vertical distance.

28. The apparatus of claim 3, wherein in the first deployed condition the airbag extends a first vertical distance measured from a point of the airbag closest to a vehicle floor toward a vehicle roof, and when the airbag is in the second deployed condition the airbag extends a second vertical distance measured from a point of the airbag closest to the vehicle floor toward the vehicle roof, the first vertical distance being greater than the second vertical distance.

29. The apparatus of claim 26, wherein in the first deployed condition the airbag extends a first vertical distance measured from a point of the airbag closest to a vehicle floor toward a vehicle roof, and when the airbag is in the second deployed condition the airbag extends a second vertical distance measured from a point of the airbag closest to the vehicle floor toward the vehicle roof, the first vertical distance being greater than the second vertical distance.

30. The apparatus of claim 26, wherein the fold in the rear panel is released and unfolds to allow the airbag to deploy to the second deployed condition.

31. The apparatus of claim 26, wherein the fold is positioned entirely outside the support structure.

32. The apparatus of claim 1, wherein the fold in the rear panel is released and unfolds to allow the airbag to deploy to the second deployed condition.

33. The apparatus of claim 1, wherein the fold is positioned entirely outside the support structure.

* * * * *